US006185829B1

(12) United States Patent
Geisel

(10) Patent No.: US 6,185,829 B1
(45) Date of Patent: Feb. 13, 2001

(54) DEVICE FOR MEASURING THE POSITION OF THE PLUNGER IN A GLASSWARE FORMING MACHINE

(76) Inventor: Hartmut Geisel, Bäckerstrasse 8, D-38678 Clausthal-Zellerfeld (DE)

( * ) Notice: Under 35 U.S.C. 154(b), the term of this patent shall be extended for 0 days.

(21) Appl. No.: 09/271,586

(22) Filed: Mar. 18, 1999

(30) Foreign Application Priority Data

Mar. 20, 1998 (DE) .............................................. 198 12 141

(51) Int. Cl.[7] .................................................. G01B 7/30
(52) U.S. Cl. .............................. 33/1 PT; 33/706; 33/710; 65/158
(58) Field of Search ................................. 33/1 PT, 1 N, 33/706, 710, 832, 833, 613; 65/158

(56) References Cited

U.S. PATENT DOCUMENTS

| 3,047,802 | * | 7/1962 | Stepanek | 33/1 PT |
| 5,025,563 | * | 6/1991 | Rennerfelt | 33/1 PT |
| 5,139,559 | | 8/1992 | Kozora | 65/158 |
| 5,263,258 | * | 11/1993 | Dobler et al. | 33/1 PT |
| 5,446,966 | * | 9/1995 | Ishizaki | 33/1 PT |
| 6,016,605 | * | 1/2000 | Hecht | 33/1 PT |

FOREIGN PATENT DOCUMENTS

3401465 C1  1/1985 (DE) .
0488136 B1  11/1991 (EP) .

* cited by examiner

Primary Examiner—Christopher W. Fulton
(74) Attorney, Agent, or Firm—Flanagan & Flanagan; John R. Flanagan; John K. Flanagan

(57) ABSTRACT

A sensor structured as a two-part oscillator is employed in a device for measuring the position of a movable operating member of a machine, such as a plunger in a glassware forming machine. The plunger is attached on a piston rod of a piston/cylinder unit cooperating with the measuring device for the continuous measurement of the position of the plunger during its stroke. The first part of the sensor is a resonance circuitry formed of a coil and a capacitor. The capacitor has first and second capacitor elements stationary relative to one another and a third capacitor element movable with the piston rod relative to the first and second elements. The resonance circuitry is disposed in the cylinder of the unit such that the resonance frequency of the resonance circuitry is variable in proportion to the change of capacitance of the capacitor in response to the change of the position of the piston rod relative to the cylinder. The second part of the sensor is isolated galvanically and separated mechanically from the first part thereof and includes a coupling coil disposed by a mounting plate of the machine adjacent to and inductively coupled with the coil of the resonance circuitry such that the coupling coil produces an output oscillation frequency of the sensor proportional to the resonance frequency of the resonance circuitry.

20 Claims, 3 Drawing Sheets

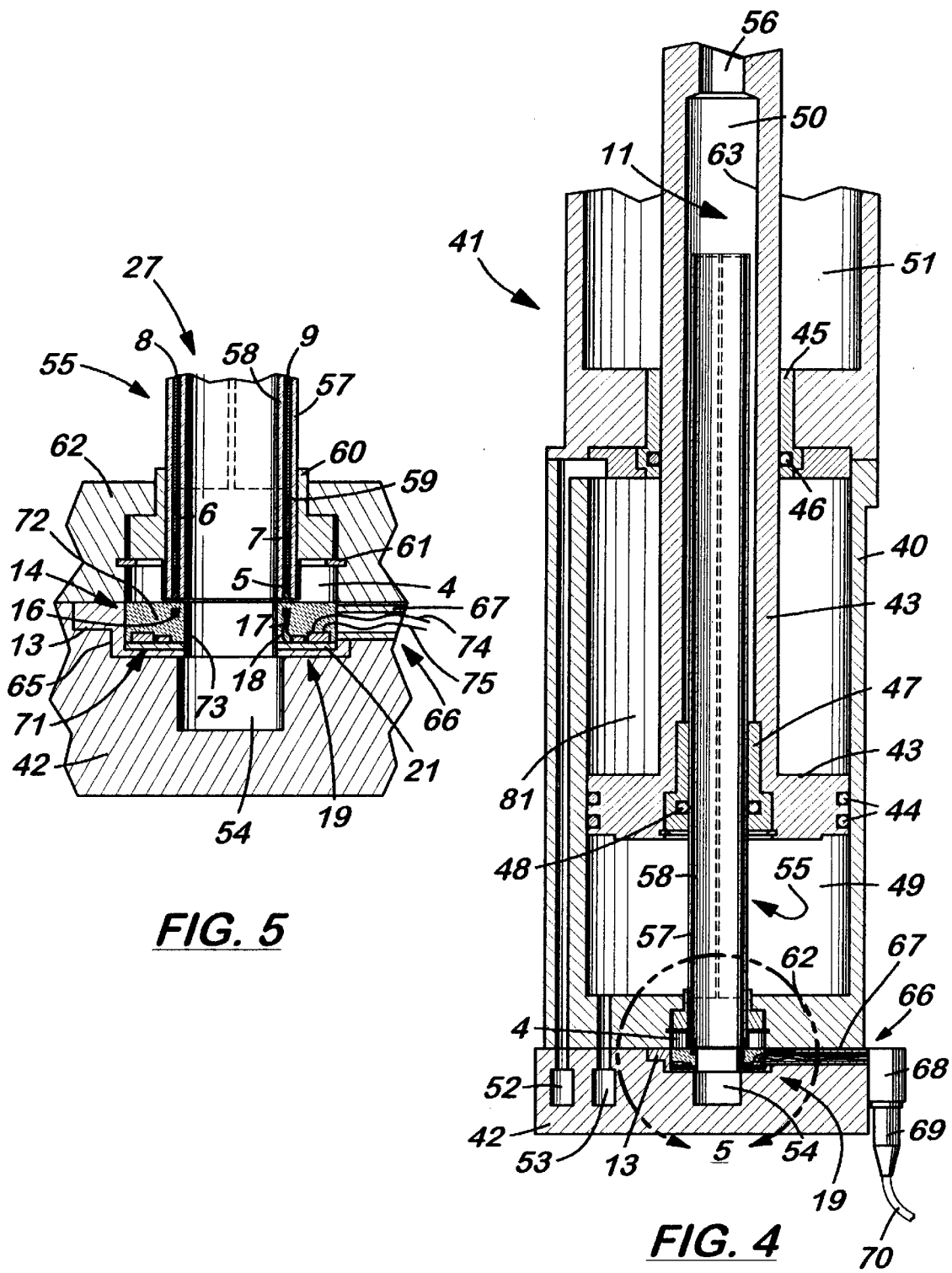

DEVICE FOR MEASURING THE POSITION OF THE PLUNGER IN A GLASSWARE FORMING MACHINE

BACKGROUND OF THE INVENTION

FIELD OF THE INVENTION

The present invention relates to position measuring devices and, more particularly, is concerned with a sensor having a two-part construction for use in translationally and rotationally operating position measuring devices, such as employed in glassware forming machines and other applications.

DESCRIPTION OF THE PRIOR ART

In the production of hollow glass articles using a press-and-blow process in a so-called I.S. glassware forming machine, gobs of molten glass with predetermined mass are successively separated from a stream exiting a feeder, placed into a forming tool of the forming machine, and shaped into a blank, also referred to as parison, by a movable plunger penetrating into the gob. The blank can then be further processed in the glassware forming machine. The plunger is attached on a piston rod of a piston/cylinder unit of the machine which cooperates with a device for the continuous measurement of the position of the plunger during its stroke. The continuous measurement of plunger position is important since, based thereon, the pressing procedure is controllable and conclusions regarding the level of filling of the mold, the penetration depth of the plunger, and thus the quality of the blank can be drawn from which corrective measures can be derived.

An apparatus of the above type is known from German Patent Document No. DE 34 01 465 C1. In the known apparatus the piston rod carries an annular core as an actuation element for changing the inductance of a coil. The coil is disposed in an annular socket in an upper portion of a cylinder directly below the piston rod support. This construction has the disadvantage that measuring technology can only determine values within a short distance of the piston stroke and a galvanic plug connection is required which, when changing the cylinder, must be detached and fastened again. In view of the limited space, it is difficult to provide the plug connection with the cable.

Such plug connections which are also included in devices known from U.S. Pat. No. 5,139,559 and European Patent Document No. EP 488 136 A2, suffer from a susceptance to failure. In the presence of accumulating dirt, they do not operate faultlessly and can even be destroyed. All known sensors of such plunger position measuring devices require considerable mechanical expenditures.

SUMMARY OF THE INVENTION

The present invention overcomes the aforementioned problems by providing a sensor in a position measuring device having a two-part construction wherein the two parts are inductively coupled to one another but galvanically and mechanically isolated from one another which avoids the necessity to use a galvanic plug connection while providing a compact, cost-effective arrangement with high precision, which, in spite of limited space, permits the ready problem-free exchange or replacement of a casing or cylinder supporting one of the two parts.

Accordingly, the present invention is directed to a sensor in a position measurement device for employment with a machine having a base, a movable operating member, a casing mounted to the base and an actuation member mounted to the movable operating member and disposed adjacent to the casing to undergo movement relative thereto with the movable operating member. The sensor, being adapted for providing continuous measurement of the position of the actuation member as it moves relative to the casing and thereby of the position of the movable operating member, is structured as a two-part oscillator.

The first part of the oscillator includes a resonance circuitry formed of a coil and a capacitor. The coil is supported on the casing of the machine. The capacitor has first, second and third capacitor elements. The first and second capacitor elements are supported on the casing of the machine in a fixed relation to one another. The third capacitor element is supported on the actuation member of the machine and movable therewith relative the first and second capacitor elements such that the resonance circuitry has a resonance frequency which is variable in proportion to the change of capacitance of the capacitor in response to the change of the position of the actuation member relative to the casing and thereby of the third capacitor element relative to the first and second capacitor elements as caused by movement of the movable operating member of the machine.

The second part of the oscillator is provided on the base of the machine such that the second part of the oscillator is galvanically isolated and mechanically separated from the first part of the oscillator. The second part of the oscillator includes a coupling coil supported on the base of the machine adjacent to and inductively coupled with the coil of the resonance circuitry of the first part of the oscillator so as to produce an output oscillation frequency proportional to the resonance frequency of the resonance circuitry.

Due to the sensor construction in the two parts, the resonance circuitry can be introduced compactly into the casing and actuation member, such being for instance a piston/cylinder unit, of the machine without the use of galvanic connectors so that the ready exchange or replacement of the cylinder of the unit is possible. A further advantage is that the measuring device can be produced cost-effectively with high accuracy being attained in the position detection.

In a practical embodiment of the invention, the machine base is a stationary mounting plate disposed in a glassware forming machine and the coupling coil of the oscillator or sensor is disposed on the mounting plate. The mounting plate also includes connections for supplying the electric energy required for the operation of the oscillator as well as for conducting out the output oscillation frequency signal of the coupling coil. In an opening of the mounting plate is disposed the coupling coil while in an opening in the bottom of a cylinder of a piston/cylinder unit is disposed the coil of the resonance circuitry in opposing relation to the coupling coil. On the mounting plate is also detachably attached the cylinder of the piston/cylinder unit with the resonance circuitry.

Further, in the practical embodiment of the invention, on the inside of a tube for delivering cooling air to a plunger, over which the hollow piston rod is translationally movable, is disposed the resonance circuitry coil whose feed lines are connected to two large capacitor areas of equal size, which are also disposed on the inside of the cooling air tube and extend over the length of the range of influence of the hollow piston rod. All galvanic connectors are thus attached permanently on a stationary mounting plate of the machine and do not need to be touched when exchanging or replacing the piston/cylinder unit. The cooling air tube and a flange part, fixable on the cylinder bottom, are preferably implemented integrally by an insulating material, for example a ceramic material.

In a preferred modification of the measuring device another tube is located within the cooling air tube and the resonance coil, its feed lines and the capacitor areas are disposed in the interspace between the two tubes. All of these parts are, in turn, affixed by adhesion with the flange part fixed on the cylinder bottom to form a hermetically sealed unit.

The oscillator output signal of the coupling coil is preferably supplied to a frequency measuring unit to which an evaluation electronics is connected for detecting the position of the plunger connected to the piston rod. The power supply of the oscillator and the conducting-out of the oscillator output voltage preferably takes place via a coaxial cable with the inner conductor and shielding assuming the DC power supply, and the oscillator output voltage, after having been conducted out, is superimposed onto the power supply DC voltage.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 4 a longitudinal sectional view of an exemplary embodiment of the sensor of the position measuring device according to the invention as applied in a plunger of a glassware forming machine.

FIG. 5 is an enlarged detailed of the portion of the sensor enclosed in the oval 5 of FIG. 4.

DETAILED DESCRIPTION OF THE INVENTION

Figure 1:
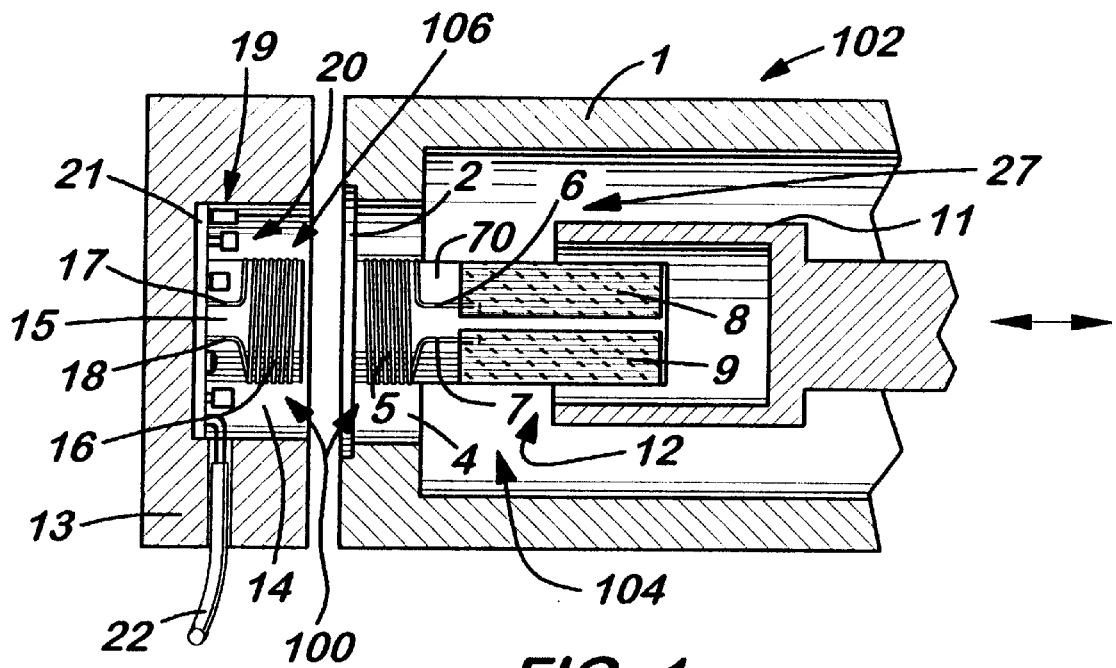
FIG. 1 is a longitudinal sectional view of a mounting plate and piston/cylinder unit of a machine shown with a sensor of a translationally operating position measuring device therein according to the invention.

Referring to the drawings and particularly to FIG. 1, there is schematically illustrated a sensor 100 of a position measuring device attached in a casing part 1 of a machine, for example, a cylinder of a piston/cylinder unit 102 in a glassware forming machine. The sensor 100 has a two part construction. A first part 104 of the sensor 100 includes a resonance circuitry 27 on the casing part 1. A second part 106 of the sensor 100, which is galvanically isolated and mechanically separated from the first part 104, includes a coupling coil 16 mounted on a mounting plate 42 of the machine. The coupling coil 16 is disposed adjacent to and is inductively coupled with the resonance circuitry 27.

The casing part 1 of the machine supports a fastening element 2 from which a core 10 projects into an opening 4 in the casing part 1. The casing part 1 is preferably made of a metal or another electrically conductive material. The fastening element 2 and core 10 are preferably made of an electrically insulating material. The core 10 bears a coil 5 of the resonance circuity 27 whose wire ends 6 and 7 are each connected to one of two areas 8 and 9 which together connection with an actuation element 11 of the machine respectively form first, second and third capacitor elements of a capacitor 12 of the resonance circuitry 27. The first and second capacitor elements, or areas 8 and 9, preferably are metal foils placed axially symmetrical on the core 10 such that they wrap nearly semicircularly around the core 10 and extend along the core 10 without coming into contact with one another. The third capacitor element, or the electrically conductive actuation element 11 which, for example, is a piston rod 43 of the piston/cylinder unit 102 connected with a plunger 108 of the glassware forming machine, is implemented as a tube and projects at a narrow spacing over the core 10 having the first and second capacitor areas 8 and 9 thereon.

Figure 3:
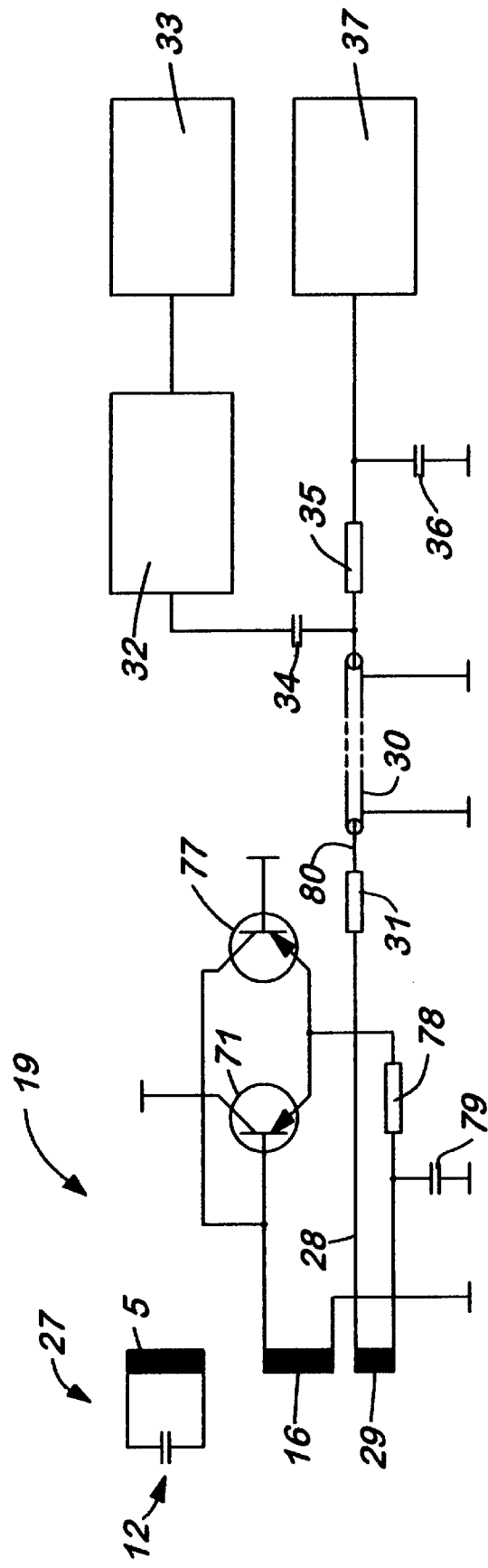
FIG. 3 is an electric circuit associated with the sensor of the position measuring device according to the invention.

The actuation member 11 is movable translationally over the capacitor areas 8 and 9 and is provided for the purpose of changing the capacitance formed by the capacitor areas 8 and 9 as a function of the position of the actuation member 11 and thus the plunger 108, whereby the resonance frequency of the coil 5 and capacitor 12 of the resonance circuitry 27 is changed. The capacitor 12 attains its highest capacitance when the actuation element 11 completely covers the capacitor areas 8 and 9. Opposite the opening 4 of the casing part 1 is disposed a further casing part 13, for example, the mounting plate 42 for a piston/cylinder unit 102 in the glassware forming machine, which preferably also comprises metal or another conductive material and which is provided with an opening 14. In this opening 14 is disposed the coupling coil 16 of the second part 106 of the sensor 100, being mounted on an electrically insulating core 15. The wire ends 17 and 18 of the coupling coil 16 are connected with an oscillator circuitry 19 whose frequency-determining oscillation circuitry is the resonance circuitry 27 formed by the resonance coil 5 and the first, second and third capacitor elements 8, 9, 43 of the capacitor 12. Components 20 of the oscillator circuitry 19 are disposed on a circuit board 21 supported in the bottom of opening 14 of the mounting plate 42. The core 15 is fastened on the circuit board 21 and is therewith held in the opening 14. When the two casing parts 1 and 13 according to FIG. 1 are disposed one in front of the other, the coupling coil 16 and the coil 5 of the resonance circuitry 27 are transformationally coupled. If the oscillator circuitry 19 is supplied with electric energy via the power supply cable 22, the componentry placed thus one in front of the other and coupled by an electromagnetic field operates as an oscillator whose high-frequency output voltage is conducted via the cable to a frequency measuring unit 32 which is connected with evaluation electronics 33, as seen in FIG. 3. The output oscillation frequency generated in the coupling coil 16 is a measure of the position of the actuation element 11 within the casing part 1.

Figure 2:
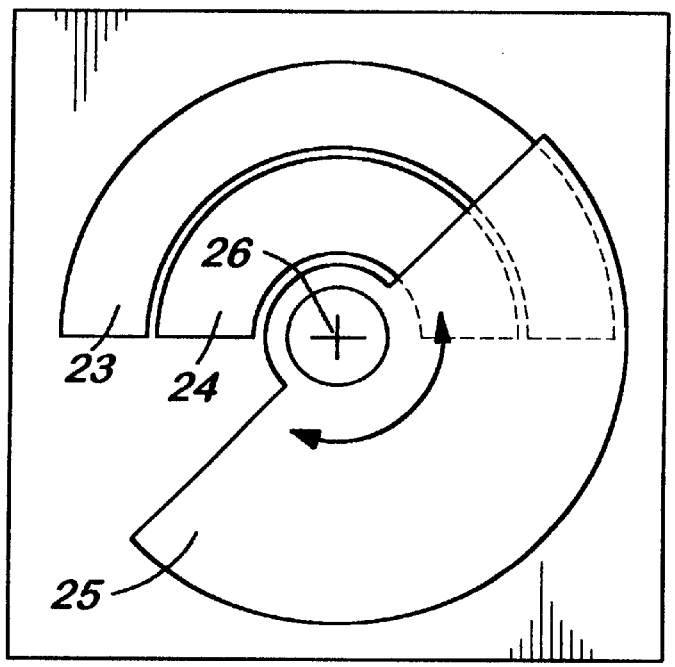
FIG. 2 is a schematical top plan view of a portion of the sensor of a rotationally operating position measuring device.

While FIG. 1 depicts an embodiment in which frequency change of the resonance circuitry 27 is generated by a translational motion, FIG. 2 represents a modification in which this frequency change takes place through a rotational displacement motion. Here the capacitor areas 23 and 24 are configured in the form of circular sectors with the actuation element 25 also being implemented as a circular sector which by rotation about an axis 26 is intended to change the capacitance of the semicircular capacitor areas 23 and 24 as a function of the position. Thereby the resonance frequency of the resonance circuitry 27 is changed. The oscillator circuitry 19 with the coupling coil 16 and the coil 5 of the resonance circuitry 27, as well as the associated casing parts 1 and 13 with openings 4 and 14, are not shown in FIG. 2 since these parts are identical to parts depicted in FIG. 1.

FIG. 3 shows a circuit diagram of the oscillator circuitry 19 which in addition to the coupling coil 16 is comprised of the resonance circuitry 27, two transistors 76 and 77, a resistor 78 and a capacitor 79. In this case the oscillator circuitry 19 is advantageously supplied via a supply line 28 from a DC power supply or source 37 via a coil 29 disposed next to the coupling coil 16 of the oscillator circuitry 19. In this manner, a single-core coaxial cable 30 can serve as the feed line for the oscillator output voltage to the frequency measuring unit 32 and for the DC power supply 37 of the oscillator. Between coil 29 and the starting point of the cable 80 a corresponding resistor 31 is disposed for matching the characteristic impedance of the coaxial cable 30. The coaxial cable 30 leads to the frequency measuring unit 32 which is connected to the evaluation unit or electronics 33. The isolation of high frequency and DC voltage takes place with a capacitor 34. A resistor 35 required for the matching to the coaxial cable 30 connects the energized core of the coaxial cable 30 with the DC power supply 37. A capacitor 36 prevents the high frequency from propagating further.

FIGS. 4 and 5 depict one practical embodiment of a position measuring device in the glassware forming machine with which the motion and position of the plunger 108 can be indicated. A piston, acted upon bilaterally by compressed air, with piston rod 43 is displaceably disposed in a cylinder 40. Piston rings 44, piston rod bearing 45 with an O-ring 46 as well as cooling air tube bearing 47 with an O-ring 48 ensures the pneumatic separation of the individual air chambers 49, 50, 51, and 81. To move the piston, compressed air is controlled via the air channels 52 and 53 through the mounting plate 42 by valves (not shown). Independently of the piston motion, cooling air is led through an air channel 54 in the mounting plate 42 through a cooling air tube 55 and the inner bore 56 of the piston with the piston rod 43 to a pressing tool (not shown). The cooling air tube 55 forms a portion of the position measuring device.

The cooling air tube 55 comprises two electrically insulating tubes 57, 58 nested one within the other, which are joined with sealing compound 59. Between the tube walls at the lower front face the coil 5 of the resonance circuitry 27 is disposed, which is connected with its wire ends 6, 7 each to one of the capacitor areas 8 and 9. The capacitor areas 8, 9 are also located between the walls of the tubes 57, 58, nested one within the other, and extend over the remaining length. The sealing compound 59 holds together the tubes 57, 58, the coil 5 and capacitor areas 8,9 of the resonance circuitry 27, and seals them hermetically. Tubes 57, 58 are affixed by adhesion at the lower end with an electrically insulating flange part 60 and fastened with a retaining ring 61 in the bottom 62 of cylinder 40. The cooling air tube bearing 47 with O-ring 48 and piston with piston rod 43 assumes the guidance of the cooling air tube 55 and the sealing of the air chamber 49 against the air chamber 50. The coil 5, capacitor areas 8 and 9 and the piston rod 43 form the electric resonance circuitry 27. The wall 63 of the bore of the piston with piston rod 43 acts onto the capacitor areas 8, 9 like the actuation element 11 in FIG. 1 and changes the capacitance formed by the capacitor areas 8, 9, leading to a change of the resonance frequency of the resonance circuitry 27. The resonance circuitry coil 5 embedded at the lower end of tubes 57, 58 projects into the opening 4 of the cylinder bottom 62.

The mounting plate 42 is provided with a corresponding bore 65 and a groove 66 leading from the peripheral edge of the plate to the bore. A tube 67 extending in the region of the cylinder bottom in the groove 66 forms a unit with an electrical plug connection 68. Through the tube 67 are guided electrical connection wires 74, 75 between the plug connection 68 and the circuit board 21. The plug 69 and a cable 70 represent the connection of the oscillator circuitry 19 with the frequency measuring unit 32, DC power supply 37 and evaluation electronics 33 shown in FIG. 3. In casing 13 is disposed the circuit board 21 bearing components 71 of the oscillator circuitry 19 and being connected to the ends 17,18 of the coupling coil 16. The coupling coil 16 is fixed concentrically in the opening 14 of the casing 13 with a sealing compound 72. A bore 73 extends coaxially through casing 13 and coupling coil 16 and forms a portion of the cooling air channel 54.

Due to the opposing placement of resonance circuitry coil 5 and coupling coil 16, a transformational coupling exists between the oscillator circuitry 19 and the resonance circuity 27 with the consequence that the configuration oscillates as an electronic oscillator at the frequency determined by the resonance circuitry 27.

A simpler measuring configuration is also conceivable in which the inner tube is omitted. In this case, the capacitor areas 8, 9 and the resonance circuitry coil 5 are placed on the inside of the cooling air tube and sealed with a coating varnish. In this case, the cooling air tube and a flange, fastenable on the cylinder bottom, can be implemented integrally comprising an insulating material, for example a ceramic material.

In each case, the measuring device assumes the mechanical functions of the cooling air tube.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A sensor in a position measurement device for employment with a machine having a mounting base, a movable operating member, a casing mounted to the mounting base and an actuation member mounted to the movable operating member and disposed adjacent to the casing to undergo movement relative thereto with the movable operating member, said sensor for providing continuous measurement of the position of the actuation member as the actuation member moves relative to the casing and thereby of the position of the movable operating member, said sensor comprising:

(a) a first part including a resonance circuitry formed of a coil and a capacitor, said coil supported on the casing, said capacitor having first, second and third capacitor elements, said first and second capacitor elements supported on the casing in a stationary relation to one another, said third capacitor element supported on the actuation member and being movable therewith relative said first and second capacitor elements such that said resonance circuitry has a resonance frequency which is variable in proportion to the change of capacitance of said capacitor in response to the change of the position of the actuation member relative to the casing and thereby of said third capacitor element relative to said first and second capacitor elements caused by movement of the movable operating member of the machine; and (b) a second part provided on the mounting base such that said second part is galvanically isolated and mechanically separated from said first part, said second part including a coupling coil supported on the mounting base adjacent to and inductively coupled with said coil of said resonance circuitry of said first part so as to produce an output oscillation frequency proportional to said resonance frequency of said resonance circuitry.

2. The sensor of claim 1 wherein said third capacitor element of said capacitor is movable translationally relative to said first and second capacitor elements of said capacitor.

3. The sensor of claim 1 wherein said third capacitor element of said capacitor is movable rotationally relative to said first and second capacitor elements of said capacitor.

4. The sensor of claim 1 wherein said resonance circuitry coil of said first part and said coupling coil of said second part are disposed in a transformationally coupled relation to one another.

5. The sensor of claim 1 wherein said second part also includes electrical conductors connected to said coupling coil for conducting in electric energy for operating said sensor and for conducting out said output signal having said oscillator frequency representing the measurement of the position of the actuation member.

6. The sensor of claim 1 wherein said coupling coil is disposed in an opening in the mounting base and said coil of said resonance circuitry is disposed opposing said coupling coil in an opening in the casing.

7. The sensor of claim 1 further comprising:
an outer tube and an inner tube disposed in said outer tube and defining an interspace therebetween, said first and second capacitor elements being spaced apart from one another and disposed in said interspace between said outer and inner tubes, said first and second capacitor elements and outer and inner tubes being affixed together by adhesion and supported on said casing so as to form a hermetically sealed unit.

8. In a glassware forming machine having a mounting plate, a piston/cylinder unit with a cylinder detachably mounted to said mounting plate and a piston rod movably mounted within and extending from said cylinder to undergo movement relative to said cylinder, a movable plunger attached to the piston rod such that said piston rod is movable therewith, and a sensor for providing continuous measurement of the position of said piston rod as said piston rod moves relative to said cylinder and thereby of the position of said plunger, said sensor comprising:

(a) a first part including a resonance circuitry formed of a coil and a capacitor, said coil supported on said cylinder, said capacitor having first, second and third capacitor elements, said first and second capacitor elements supported on said cylinder in a stationary relation to one another, said third capacitor element supported on said piston rod and being movable therewith relative said first and second capacitor elements such that said resonance circuitry has a resonance frequency which is variable in proportion to a change of capacitance of said capacitor in response to a change of the position of said piston rod relative to said cylinder and thereby of said third capacitor element relative to said first and second capacitor elements as caused by movement of said plunger of said glassware forming machine; and (b) a second part provided on said mounting plate such that said second part is galvanically isolated and mechanically separated from said first part, said second part including a coupling coil supported on said mounting plate adjacent to and inductively coupled with said coil of said resonance circuitry of said first part so as to produce an output oscillation frequency proportional to said resonance frequency of said resonance circuitry.

9. The machine of claim 8 wherein said third capacitor element of said capacitor is movable translationally relative to said first and second capacitor elements of said capacitor.

10. The machine of claim 8 wherein said third capacitor element of said capacitor is movable rotationally relative to said first and second capacitor elements of said capacitor.

11. The machine of claim 8 wherein said resonance circuitry coil of said first part and said coupling coil of said second part are disposed in a transformationally coupled relation to one another.

12. The machine of claim 8 wherein said second part also includes electrical conductors connected to said coupling coil for conducting in electric energy for operating said sensor and for conducting out said output signal having said oscillator frequency representing the measurement of the position of said piston rod and thereby of said plunger.

13. The machine of claim 8 wherein said coupling coil is disposed in an opening in said mounting plate and said coil of said resonance circuitry is disposed opposing said coupling coil in an opening in said cylinder.

14. The machine of claim 8 further comprising:
an outer tube and an inner tube disposed in said outer tube and defining an interspace therebetween, said first and second capacitor elements being spaced apart from one another and disposed in said interspace between said outer and inner tubes, said first and second capacitor elements and outer and inner tubes being affixed together by adhesion and supported on said cylinder so as to form a hermetically sealed unit.

15. The machine of claim 8 further comprising:
a cooling air tube disposed through said cylinder for delivering cooling air to said plunger and supporting said first and second capacitor elements, said piston rod being movable translationally over said cooling air tube, said coil of said resonance circuitry being disposed on an end of said cooling air tube facing said mounting plate, said coil of said resonance circuitry having feed lines connected to said first and second capacitor elements on said cooling air tube.

16. The machine of claim 15 wherein said first and second capacitor elements are in the form of two areas of substantially equal size disposed on the inside of said cooling air tube and extending over substantially the length of said hollow piston rod.

17. The machine of claim 16 wherein said cooling air tube and a flange part fixed on a bottom end of said cylinder are formed integrally by an insulating material.

18. The machine of claim 17 wherein said insulating material is a ceramic material.

19. The machine of claim 8 further comprising:
a frequency measuring unit for receiving said oscillator output signal of said coupling coil;
an evaluation electronics connected to said frequency measuring unit for detecting the position of said plunger connected to said piston rod.

20. The machine of claim 8 further comprising:
a power supply and the conducting-out of the oscillator output voltage takes place via a coaxial cable with an inner conductor and shielding assuming a DC power supply, said oscillator output voltage, after having been conducted out, is uperimposed onto a DC voltage of said power supply.

* * * * *